US006181347B1

(12) United States Patent
Devic et al.

(10) Patent No.: US 6,181,347 B1
(45) Date of Patent: Jan. 30, 2001

(54) SELECTABLE MODE SMOOTHING TEXTURE FILTER FOR COMPUTER GRAPHICS

(75) Inventors: Goran Devic, Austin; Christopher Shaw, Pflugerville, both of TX (US)

(73) Assignee: Cirrus Logic, Inc., Fremont, CA (US)

( * ) Notice: Under 35 U.S.C. 154(b), the term of this patent shall be extended for 0 days.

(21) Appl. No.: 08/932,760

(22) Filed: Sep. 17, 1997

(51) Int. Cl.$^7$ ................................................. G06T 11/40
(52) U.S. Cl. ............................................................. 345/430
(58) Field of Search ................................. 345/136, 138, 345/430–432

(56) References Cited

U.S. PATENT DOCUMENTS

| | | | |
|---|---|---|---|
| 4,583,185 | 4/1986 | Heartz | 364/521 |
| 4,586,038 | 4/1986 | Sims et al. | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,868,771 | 9/1989 | Lee et al. | 364/578 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 4,974,176 | 11/1990 | Buchner et al. | 364/522 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,740,344 | * 4/1998 | Lin et al. | 345/430 |

FOREIGN PATENT DOCUMENTS 9636011  11/1996  (WO).

OTHER PUBLICATIONS

Application Ser. No. 08/831,283; Inventors: Gautam P. Vaswani, Daniel P. Wilde and Thomas Dye; Filed Mar. 31, 1997; Title of Invention: Dynamically Selectable Texture Filter for Computer Graphics.

* cited by examiner

*Primary Examiner*—Mark R. Powell
*Assistant Examiner*—Thu Nguyen
(74) *Attorney, Agent, or Firm*—Jonathan M. Harris; Peter Rutkowski; Robert P. Bell

(57) ABSTRACT

A graphics system including a selectable mode smoothing filter for improved texture mapping. An x, y pixel coordinate is mapped into a u, v texture map. The mapped u, v coordinate includes integer and fractional portions. Depending on the location of the coordinate relative to the four nearest texels, which are represented as integers, one of several texture mapping schemes are used to either select or calculate the texel value to be used to render the pixel at the x, y screen location. The three texture mapping schemes include point sampling in which the nearest texel from the texture map is selected, two-texel averaging in which the closest two texels are combined in a weighted average, and four-texel averaging in which the closest four texels are combined in a weighted average. Scale factors in the range of 0 to 1 are computed for averaging texel values together. By including the complete range of 0 to 1, the scale factors permit greater control over the averaging process and accordingly, images with high spatial frequency content are not distorted as much as in previous graphics systems. By providing a selectable filter than can perform point sampling or two or four-texel averaging, the speed benefit of point sampling can be approached as well as the superior quality of two and four-texel averaging.

5 Claims, 7 Drawing Sheets

SELECTABLE MODE SMOOTHING TEXTURE FILTER FOR COMPUTER GRAPHICS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphics system for a personal computer. More particularly, the present invention relates to a graphics system for providing texture to images on a computer screen. Still more particularly, the present invention relates to an improvement in texture filtering techniques.

B. Background of the Invention

Before the availability of the personal computer (commonly referred to as a PC), computer graphics packages were expensive tools primarily reserved for industrial applications. Early microcomputers were only capable of rendering simple line drawings with a low screen resolution (256 pixels×256 pixels, for example). As microcomputers evolved, higher resolution color displays became available, and software applications routinely provided data output in a graphical format. The graphics techniques used were unstructured, with objects defined in terms of absolute coordinates using straight lines. Subsequently, graphics "primitives" were developed, enabling circles, ellipses, rectangles and polygons to be drawn with single software instructions. The use of primitives for drawing shapes increased the speed at which the images could be rendered.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. A set of vertex points defines a polygon. Associated with each point are certain parameters, such as shading, texturing, color, and the like. Identification of other non-vertex points within the polygon typically is done through the use of linear interpolation. Once interpolated, the polygon can be rendered on a computer monitor by scanning of successive rows of the polygon. By drawing multiple polygons on the screen at a time, an object can be drawn.

Further advancements in the computer graphics arena have led to techniques for enhancing the realistic appearance of objects drawn on the screen. Texture mapping, one of the significant aspects of 3-D graphics, permits images on a computer screen to be displayed with texture. Thus, for example, a table top can be textured to have the appearance of a wood-grain or marble surface, or any other desired surface. In computer graphics, a texture map is an array of pixels that represents a particular pattern, such as a single brick. By repeatedly applying the texture map of a brick to side of a building, for example, the side will appear as a brick wall. The amount of memory required to represent the brick wall is minimal because only enough memory is required to store a texture map for a single brick.

A pixel in a texture map is called a "texel." A texture map typically is constructed from a two-dimensional array of texels (typically represented with digital values). A u, v address or coordinate is associated with each texel value in the texture map. Pixels on the computer screen, however, are assigned x, y coordinates or addresses to represent the spatial location of the pixel on the computer screen. Thus, a pixel with an address of (10, 14) would be in the tenth column of pixels, fourteen rows down from the top of the computer screen. Because texel values are not assigned an x, y value when applying a texture map to a polygon on the screen, a conversion from an x, y pixel address to a u, v texture map address is necessary. The conversion process is termed "texture mapping." A texture mapping algorithm thus uses an x, y pixel address to look up a corresponding texel in a texture map. The texel is then used to render the pixel at the x, y screen address.

Texture maps often are applied to objects that are a different shape and size from the texture map. For example, a texture may be expanded and applied to an object that is larger than the original texture map. Expanding a texture map to apply to an object, however, makes the resulting object appear blocky. To minimize this and related problems with applying texture maps to screen objects, graphics systems normally employ texture filtering techniques. Some of these filtering techniques are described below.

Ordinarily, an x, y pixel address converts to a fractional u, v texture map coordinate. A "10.16" format is typically used to represent the converted u and v coordinates in which 10 bits are used for the integer portion of the coordinate along with 16 fractional bits. The coordinates of texel values in a texel map, however, include only integer values, and thus the converted u, v coordinate usually will not map exactly to a texel in the texel map. Point sampling provides the simplest method for selecting a texel from a texel map for applying to objects. In point sampling, the texel from the texture map closest to the fractional u, v coordinate is selected to render the corresponding x, y pixel on the screen. For example and referring now to FIG. 1, four texels A, B, C, and D from a texture map are shown with their integer u, v coordinates. An address in x, y space might convert to u, v texture space as point P1 with u, v coordinates (0.25, 0.30). Of the four closest to texels A, B, C, and D, point P1 is closest to texel A. Using the point sampling technique, texel A would be selected to be mapped onto the x, y pixel. With point sampling, only one texel is used for each pixel during mapping and thus only one memory access is required to fetch the selected nearest texel. Although simple and fast, images rendered with point sampling may appear blocky and "scintillate," or sparkle, when the object moves detracting from the appearance of the object.

In certain instances, however, point sampled images are acceptable. For example, rendered with perspective, a brick wall may appear to recede into the distance. The appearance of the foreground part of the wall would suffer if point sampling was used because the texture map used may be "super sampled" meaning the same texel value will be used for a large group of pixels in the wall. However, the problems associated with super sampled point sampled images would be imperceptible if point sampling were used to texture the distant part of the wall because of the diminished resolution associated with objects drawn to appear distant. However, problems with subsampled textures may occur on the distant part of the wall as too few texels may be used from the texture map causing insufficient texture information to be used to give a realistic brick wall appearance.

Another filtering technique referred to as bilinear averaging results generally in higher quality texture images. Bilinear averaging combines the four nearest texels in a weighted average to derive a single texel value used to render the pixel. Referring again to FIG. 1, in the u axis point P1 is generally closer to texel A than texel B and closer to texel C than texel D. Thus, the bilinear weighted average of texels A, B, C, and D generally weights A more than B, and C more than D. In the v axis, the result is similar with texels A and B weighted more heavily than texels C and D because point P1 is closer to texels A and B than C and D. Bilinear averaged images achieve superior quality than point sampled images, but require more computer and processing power. Because four texels are averaged together, four accesses to texture memory are required to fetch the four texels, taking considerably more time than the single memory access required by point sampling. Further, the averaging process, including calculation of the weights associated with each texel to be averaged, requires time to perform.

Graphics systems that employ texturing typically use only one texture mapping technique at a time when rendering images. Thus, one graphics system might use point sampling for faster speed, while other systems might use bilinear averaging for higher quality. Both types of systems, however, suffer from the problems attendant to each texturing technique.

Another filtering technique described in commonly assigned and co-pending application "Dynamically Selectable Texture Filter For Computer Graphics," Ser. No. 08/831,283, filed Mar. 31, 1997, combines the speed advantage of point sampling with the quality advantage of bilinear averaging. In this technique, the texel array is divided into nine regions as shown in FIG. 2. The area surrounding the four texels A, B, C, D are divided into the nine regions labeled I–IX. In accordance with the preferred embodiment described in Ser. No. 08/831,283, the graphics processor uses the point sampling technique when a fractional texel coordinate corresponds to one of the four corner regions I, III, VII and IX. The graphics processor however, averages the two nearest texel values when the fractional u, v coordinate falls within one of the four side regions II, IV, VI, and VIII. Finally, the graphics processor computes a four texel average when the fractional texel coordinate falls within the center region V. This technique takes advantage of the speed benefit from point sampling when a fractional texel coordinate is close to one texel in a texture map, but also takes advantage of the quality improvements realized by using a two or four texel filtering technique when the fractional texel coordinate lies elsewhere.

Although the filtering techniques described above solve many of the short comings associated with texture mapping, these techniques may still be improved. Many images, such as a checkerboard 70 shown in FIG. 3, include high frequency components. The checkerboard 70 in FIG. 3 includes an array of alternating black squares 71 and white squares 73, although in general each square may include any color besides black and white. The transition 72 in color between black square 71 and white square 73 is very sharp, occurring over a range of one pixel. The sharp transition 72 corresponds to a high spatial frequency, as is well known. The filtering techniques described above represent low pass filters. A low pass filter passes only low spatial frequency components of an image, while attenuating or eliminating high spatial frequency components of the image. Because the checkerboard 70 in FIG. 3 includes both low spatial frequency components represented at the center of each square 71, 73, and high special frequency components represented by the sharp color transition 72 between squares, low pass filtering checkerboard 70 allows the low frequency components to pass through the filter unhindered, while attenuating or completely eliminating the high frequency transitions. The resulting filtered image may bare little resemblance to the checker board shown in FIG. 70 as the transitions between squares of color are blurred.

The filtering technique of co-pending application Ser. No. 08/831,283, filed Mar. 31, 1997 is now further described with reference to FIG. 4. The coordinates of two exemplary texels, texel A and texel B are shown along the horizontal axis which represents the texel coordinate. Unless otherwise stated, all texel coordinates refer to sub-texel coordinates in which each coordinate is defined relative to an adjacent texel. Referring to FIG. 2, for example, the sub-texel coordinates of texels B (1,0), C (0,1), and D (1,1) are defined relative to texel A which is assumed to have a sub-texel coordinate of (0, 0).

Referring to FIG. 4, the color value associated with texel A is shown as color A on the vertical axis and the color value associated with texel B is also shown on the vertical axis as color B. The sub-texel coordinates between texel A and texel B are divided into three ranges 52, 54, 56. These ranges correspond to regions I, II, and III, respectively, in FIG. 2. The preferred embodiment of this invention describes a graphics processor that employs the point sampling filtering technique when a texel coordinate is in regions 52 or 56. For sub-texel coordinates in range 52, the graphics processor uses only color A to render the pixel on the screen, and does not average colors A and B together. Similarly, the graphics processor uses only color B for sub-texel coordinates within range 56. In the intermediate range 54, the graphics processor computes a weighted average of the color A and color B values to produce a color value in the range 60. The weighted average is computed based on a scale factor determined as a percentage of the range between texels A and B corresponding to the sub-texel fractional coordinate. For example, if the sub-texel coordinate is exactly half way between texels A and B, then color A and color B are averaged evenly (i.e., scale factor equal to 0.5). If, however, the sub-texel coordinate corresponds to a value of ¼ (i.e., ¼ of the range between texel A and texel B and represented by coordinate 50), then the scale factor equals ¼ and the weighted average is computed by combining ¼ of color B with ¾ of color A (color A*¾+color B*¼). The transitions between the point sampling regions 52, 56 and the weighted average region 58, represented by vertical lines 57, are abrupt and cause the bluriness or distortion described above with respect to the checkerboard 70.

Texture mapping techniques, such as point sampling and bilinear averaging for example, have advantages and disadvantages as discussed above. Point sampling is generally faster than bilinear averaging, but bilinear averaging generally produces higher quality images than images produced using point sampling. Current graphics systems typically only use one texture mapping technique. Thus, one system might use only point sampling to apply a texture map to an object on the screen, while another system might use bilinear averaging. The advantages current graphics systems enjoy, as well as the disadvantages such systems suffer, depend to a large extent on the particular texture mapping technique used. Generally, graphics systems designers tradeoff speed against quality; higher speed is achieved with point sampling and higher image quality is achieved with bilinear averaging.

Thus there is a need for an improved graphic system that allows texture maps with high frequency components, such as a checkerboard, to be applied to an object on the screen with as little distortion as possible. Such a system should preferably combine the speed advantages of point sampling with an improved multi-texel averaging technique to provide a graphics system that generates high quality images at faster speeds than previous graphics systems. Despite the advantages such a system would offer, to date no such system is known.

BRIEF SUMMARY OF THE INVENTION

A method and apparatus is disclosed which includes a selectable mode smoothing filter for improved texture mapping. As part of the texturing process, and in accordance with prior techniques, an x, y pixel address is converted to a u, v coordinate in a texture map. The converted u, v coordinate includes integer and fractional portions. The texture map includes texels with only integer coordinates. Depending on the location of the u, v coordinate relative to the four closest texels, the present invention selects one of three texture mapping schemes to select a texel value from the texture map to use in rendering the pixel at the x, y pixel address. The three texture mapping schemes used to select the texel value preferably include point sampling (in which the nearest texel from the texture map is selected), two-texel averaging (in which the closest two texels are combined in a weighted average), and four-texel averaging (in which the closest four texels are combined in a weighted average).

In accordance with the present invention, the graphics system selects the texture mapping scheme to implement based upon some predetermined criteria. Thus, the point sampling scheme preferably is implemented when the u, v coordinate is within a predetermined distance from a texel. If the point sampling scheme is implemented, the closest texel is selected and used to render the x, y pixel. Point sampling generally is faster than other texture mapping techniques, but provides graphics images whose quality is inferior to other techniques. By only implementing point sampling when the converted u, v coordinate is relatively close to a texel value in the texel map, graphics distortion is kept at a minimum, while the system speed is maximized.

If, however, the converted u, v coordinate is located within a predetermined distance from two texels, but greater than a certain distance from all other texels, then the two closest texels are combined in a weighted average. The two-texel average weights the closest texel proportionately more heavily than the other texel. Two-texel averaging generally is slower than point sampling because two texels must be fetched from memory, weights for each texel must be calculated, and the texels then must be combined in a weighted average. The quality of two-texel filtered images, however, is generally superior to images produced by point sampling. In addition, the graphics processing of a two-texel filtering scheme is faster than a four-texel averaging scheme.

If the mapped u, v coordinate is sufficiently distant from all four of the four closest texels, the four closest texels are combined in a weighted average based upon the proximity of each texel to the converted u, v coordinate values. Consequently, texels closer to the u, v location are weighted more heavily than the texels located farther away from the converted coordinates. Four-texel averaging generally provides superior computer graphics, but requires the time-consuming retrieval of four texels from memory, as well as the calculation of a weight for each texel and the weighted combination of the four texels.

The weights, or scale factors, calculated for each texel in the two and four texel averages are a function of the proximity of the converted fractional u, v coordinate to each of the two or four nearest texels in the texture map. The scale factors range from 0 to 1 and are computed by subtracting a first value from the fractional u, v coordinate and the difference is then multiplied by a second value. In accordance with the preferred embodiment, the first value equals ¼ and the second value equals 2. Accordingly, the logic necessary to compute the scale factors generally requires simple shift registers.

By providing a selectable filter that performs point sampling, as well as two or four-texel averaging, the graphics system can achieve the speeds approaching those of systems that use only point sampling, while at the same time obtaining superior quality texturing. Moreover, the areas in the texture map in which each of the three texture mapping techniques is used is adjustable permitting increased system flexibility to fine tune the texture mapping process. Thus, a programmer can use the fast point sampling when quality and accuracy of an individual texel is of less concern, while using a higher quality scheme in other instances. Further, because the scale factors range from 0 to 1, greater control is provided over the filtering process. Accordingly, screen images with high spatial frequency components are not distorted as much as with previous filtering techniques.

BRIEF DESCRIPTION OF THE DRAWINGS

For a detailed description of the preferred embodiments of the invention, reference will now be made to the accompanying drawings wherein.

DETAILED DESCRIPTION OF THE PREFERRED EMBODIMENT

Figure 5:
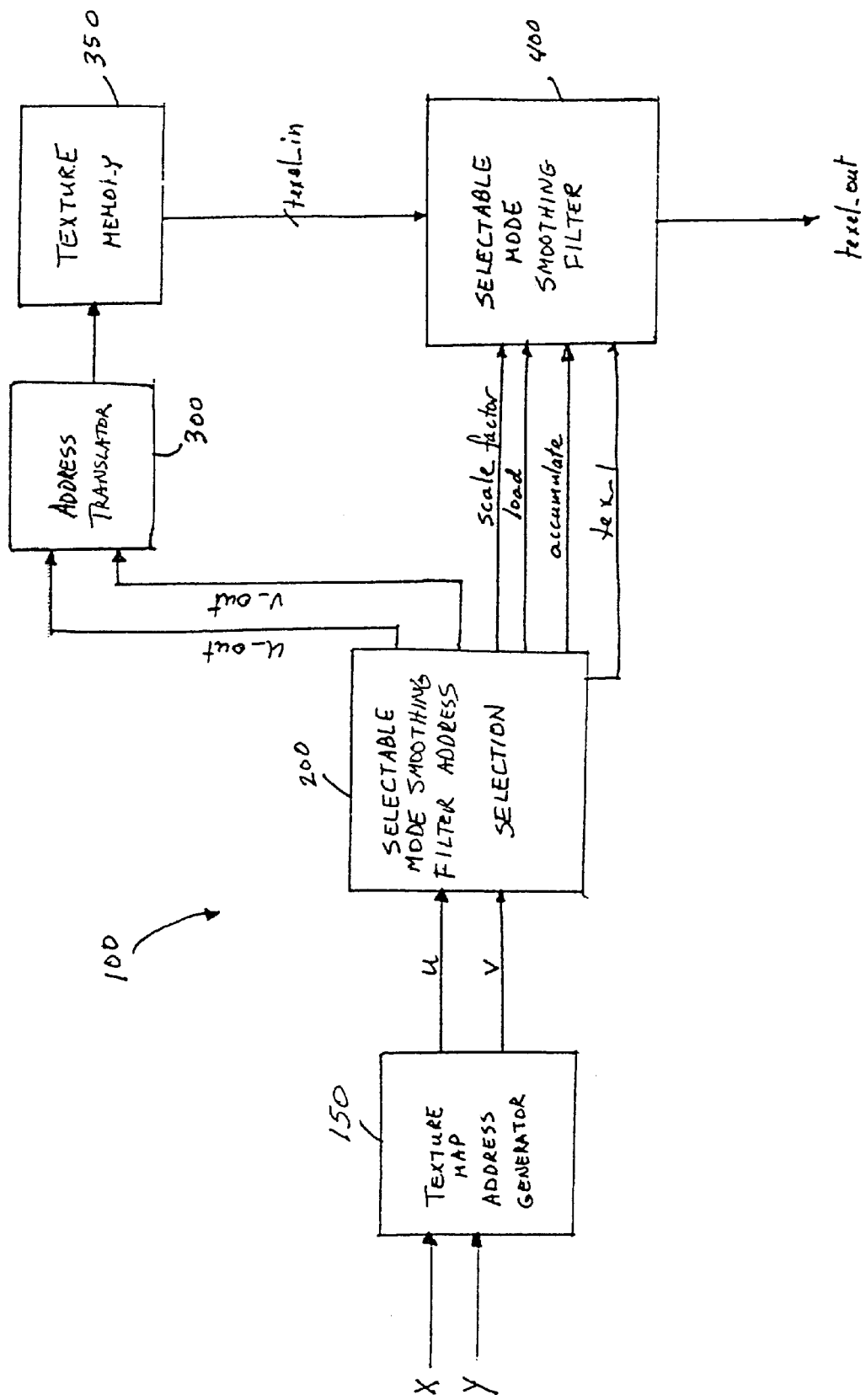
FIG. 5 is a block diagram a preferred embodiment including a selectable mode smoothing filter address selection and a selectable mode smoothing filter.

Referring now to FIG. 5, a graphics processor 100 constructed in accordance with a preferred embodiment generally includes texture map address generator 150, selectable mode smoothing filter address selection 200, address translator 300, texture memory 350, and selectable mode smoothing filter 400. An x, y pixel address is provided as an input to texture map address generator 150 which converts the x, y pixel address to a fractional u, v texel coordinate (i.e., a coordinate with integer and fractional portions). Graphics system 100 uses the u, v coordinate to access texel values from texture memory 350. Selectable mode smoothing filter 400 calculates scale factors to linearly combine the texel values (texel_in) from texture memory 350 to compute a single texel output value (texel_out) which then is used to render the pixel associated with the x, y address. Load and accumulate signals are also provided by selectable mode smoothing filter address selection 200 to selectable mode smoothing filter 400 to control operation of filter 400, as will be explained in detail below with reference to FIG. 9.

Texture map address generator 150, address translation 300, and texture memory 350 are components known to those of ordinary skill in the art. Texture map address generator 150 preferably converts an x, y pixel address to a u, v coordinate with a 10.16 format. The u, v coordinate with a 10.16 format includes 10 integer bit and 16 fractional bit values. Selectable mode smoothing filter address selection 200 preferably produces an integer u, v texel address, (u_out, v_out,) according to the smoothing filter techniques of a preferred embodiment of the invention. Address translation unit 300 translates the (u_out, v_out) texel address into a texture memory address.

Texture maps preferably are stored in texture memory 350. Texture memory 350 may include any common memory device and preferably includes random access memory (RAM) operating as system memory. The texture map address provided by address translation 300 to texture memory 350 preferably comprises physical memory address space. Address translation 300 may be integrated in the memory controller unit (not specifically shown) of the computer if desired.

Figure 2:
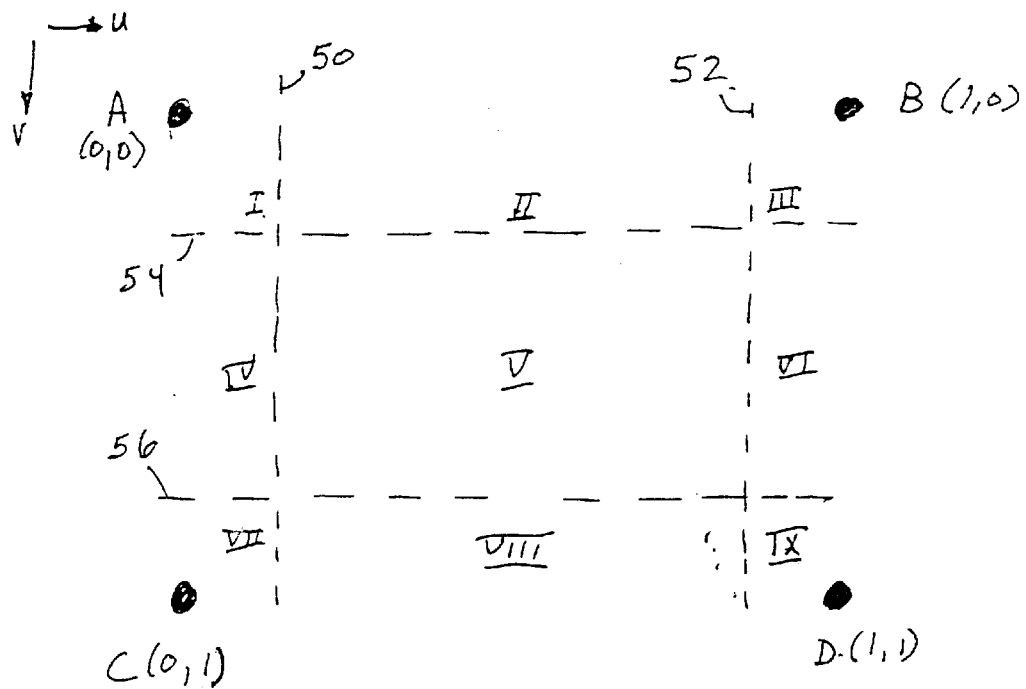
FIG. 2 is a portion of a texture map divided into nine regions for texture mapping in accordance with the present invention.
Figure 3:
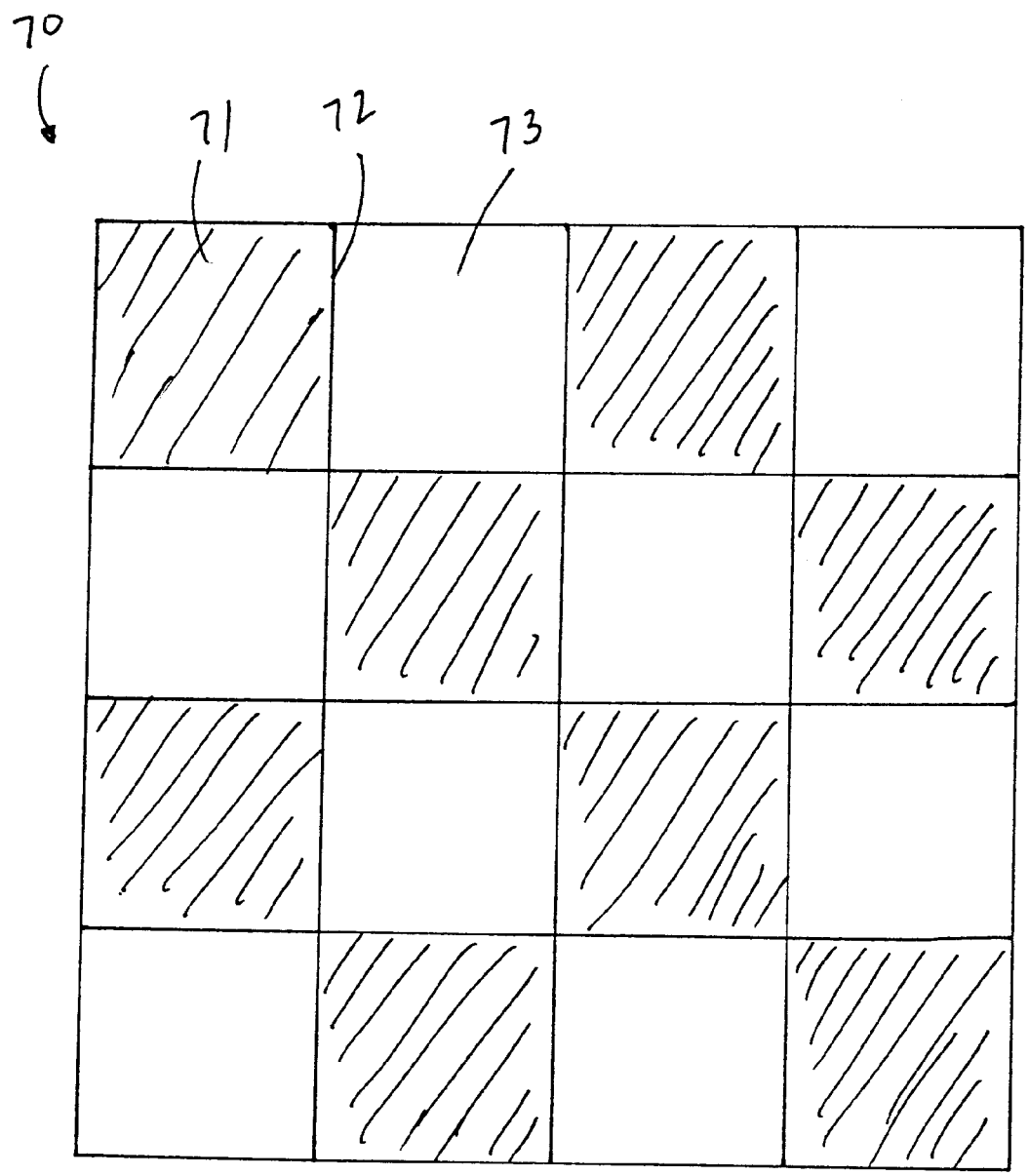
FIG. 3 illustrates an exemplary object with high spatial frequencies to be rendered on a monitor.

Referring now to FIG. 2, a group of four texels A, B, C, D from an exemplary texture map is shown divided into nine regions labeled I, II, III, IV, V, VI, VII, VIII, and IX, respectively. The nine regions are separated by dashed lines 50, 52, 54, 56. Each texel has an integer sub-texel u, v address or coordinate. As shown, the u axis runs horizontally and the v axis runs vertically in accordance with normal convention. Texel A has a u, v address of (0,0), while the address of texel B is (1,0), and the addresses of texels C and D are (0, 1) and (1,1), respectively. As discussed in the Background of the Invention, the conversion of an x, y address to a u, v coordinate typically results in a u, v coordinate with a fractional value. The smoothing texture filter of the preferred embodiment dynamically selects an appropriate texture filtering technique for each pixel. As will be seen below, the selection of the filtering technique depends on the location of the u, v texel coordinate within the nine regions.

The present invention takes advantage of the benefits of three texture filtering techniques and uses each technique only in those situations in which the speed versus quality tradeoff favors each technique. Moreover, it is understood that other texture filtering techniques may be included as part of the selection process.

Figure 1:
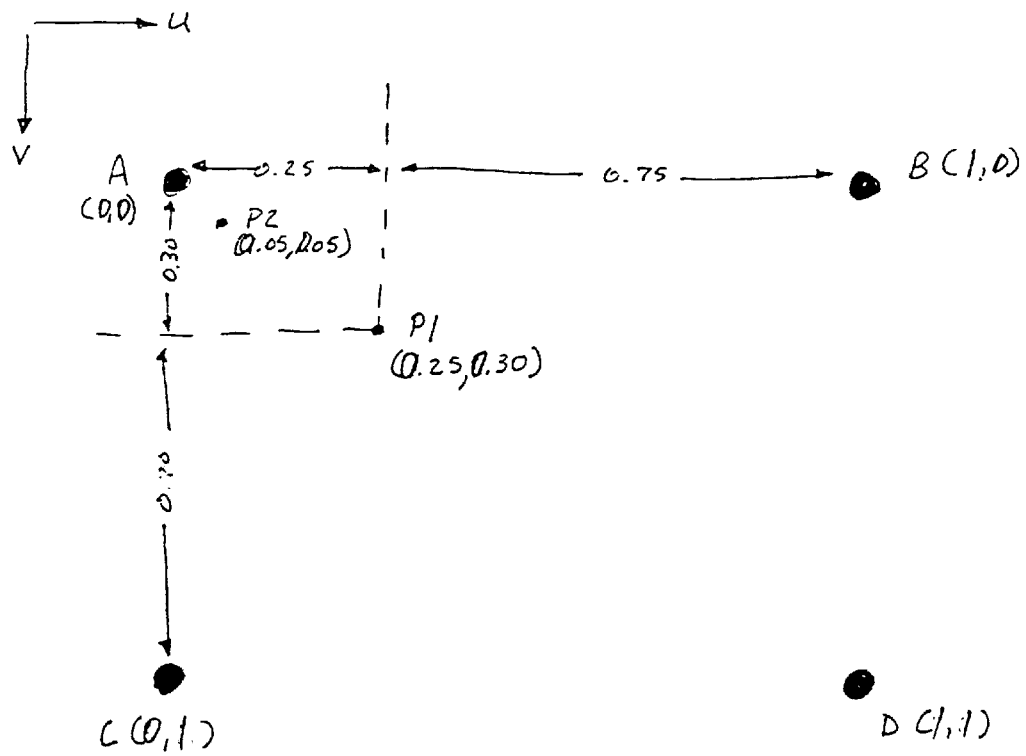
FIG. 1 illustrates exemplary portion of a texture map including two points with fractional u, v coordinates.

The determination as to which filtering technique to use is made dynamically for each texel while the image is being drawn on the screen. Thus, one texel value for rendering a pixel may be generated using one filtering technique, while the next texel is generated using a different technique, and so on. In those situations when the benefit of point sampling (higher speed) outweighs its disadvantage (lower quality images), point sampling is used as the texture filtering technique of the preferred embodiment. Further, in those instances that favor high quality images over speed, the two or four nearest texels are linearly averaged together. For example, referring to FIG. 1, the sub-texel u, v coordinate of point P2 (0.05, 0.05) is very close to texel A. Graphics systems that use bilinear averaging will combine texels A, B, C, and D to generate a four texel, weighted average for point P2. Because of the substantial proximity of point P1 to texel A, however, the value of texel A dominates the averaging equation and heavily influences the texel value of point P1. In fact, the texel color value computed for point P1 may be almost identical to the color value of texel A. In that case bilinear averaging provides little benefit because the weights given to texels B, C, and D are minimal compared to the weight given texel A. The same result is true for any u, v point substantially close to a texel. Thus, for this situation, the speed advantage of point sampling outweighs the quality advantage of bilinear averaging. Referring still to FIG. 2, regions I, III, VII, and IX represent those regions in which point sampling preferably is used by the present invention. For u, v coordinates falling within these regions, the speed advantage of point sampling generally outweighs the quality benefit of bilinear averaging, or any other filtering technique.

Bilinear filtering (or four-texel averaging) is employed for u, v coordinates falling within region V because points in region V are sufficiently distant from texels A, B, C, and D that the quality benefit of bilinear filtering becomes crucial, outweighing the higher speed of point sampling.

For u, v points falling within regions II, IV, VI, and VIII, a different filtering method is used in which the nearest two texels are averaged together with appropriate scale factors. Points in region II, for example, are sufficiently distant from texels C and D that if bilinear averaging were used, the relative contributions to the computed texel value would be dominated by contributions from texels A and B, with little contribution from texels C and D. In computing texel values for points in region II, texels C and D are ignored and only texels A and B are used in a two-texel, scaled averaging technique. Similarly, for region IV, texels A and C are averaged. For region VI, texels B and D are averaged and for region VIII, texels C and D are averaged.

Figure 4:
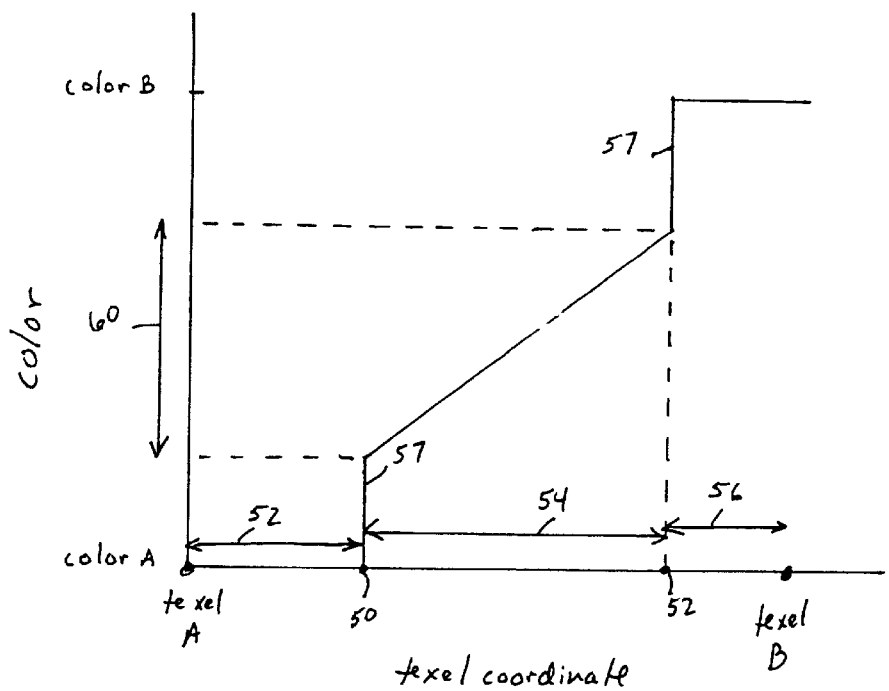
FIG. 4 shows a prior art technique for averaging texel values together.

Scale factors are calculated for each texel A and B. The scale factors are a function of the proximity of the u, v coordinate to each texel. Thus, closer texels are weighted more heavily than more distant texels. The averaging technique of the preferred embodiment, however, represents a significant advance over the technique of U.S. application Ser. No. 08/831,283 generally illustrated in FIG. 4. The averaging technique of the preferred embodiment is referred to as a smoothing filter technique because it smoothes the sharp color transactions that typify filtered renditions of images with high spatial frequency content.

Figure 6:
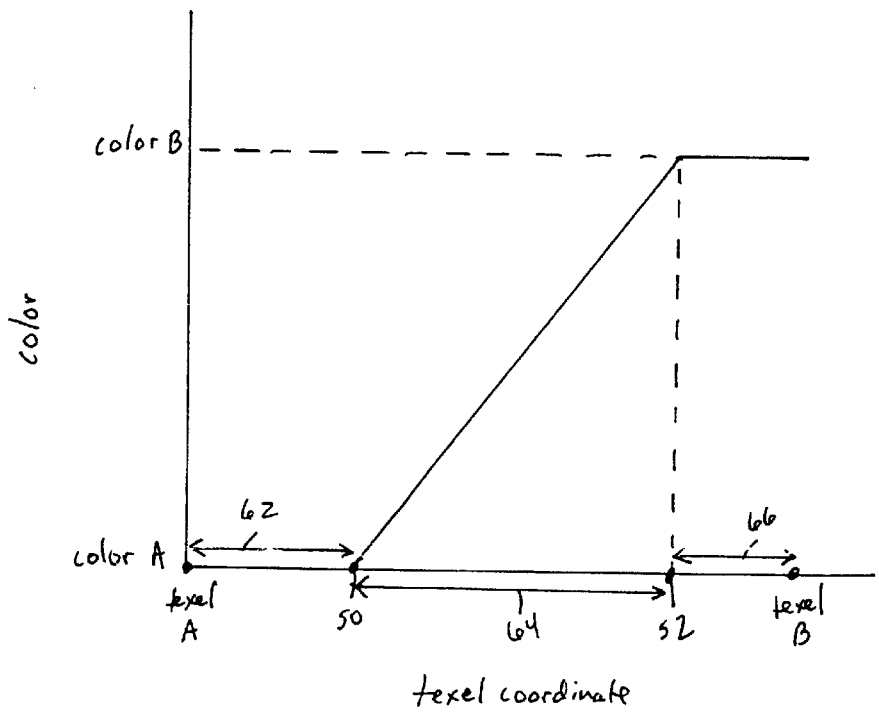
FIG. 6 illustrates the improved texel averaging technique of a preferred embodiment of the invention.

Referring now to FIG. 6, the smoothing filter technique of the preferred embodiment uses point sampling when a sub-texel coordinate is in ranges 62 and 66 near texels A and B and an improved weighted averaging technique when a sub-texel coordinate is in intermediate range 64. A scale factor is determined for sub-texel coordinates in region 64 for use in calculating the weighted average. The scale factors preferably range between 0 and 1. A scale factor associated with coordinate 50 preferably is 0 and the scale factor of point 52 is 1. The scale factor varies linearly between points 50 and 52 within the range of 0 to 1. At point 51, halfway between points 50 and 52, the scale factor is ½. Because the range of scale factors includes the complete range of values between 0 to 1, there are no sharp discontinuities in FIG. 6, in contrast with the averaging scheme of U.S. application Ser. No. 08/831,283 generally illustrated in FIG. 4. Moreover, the smoothing filter technique of the preferred embodiment provides smoother transitions between ranges of texel coordinates in which no averaging is required (ie., ranges 62, 66) and ranges in which averaging is required (range 64). The preferred filtering technique thus allows images with high spatial frequency components to be drawn on a screen with less distortion than previously possible. Although illustrated with respect to texels A and B, whose sub-texel coordinates differ only with respect to the u coordinate, the smoothing filter technique preferably is applied to adjacent texels along both the u and v axes as described in detail below.

Although boundary lines 50, 52, 54, 56 in FIG. 2 can be set anywhere, it is preferred for lines 50, 52, 54, 56 to be set at the ¼ and ¾ interval points between adjacent texels. Accordingly, boundary line 50 is set at a point ¼ of the range of sub-texel coordinates between texel A and texel B. Boundary line 52 is set a point ¾ of the range of the range between texels A and B. Boundary lines 54, 56 similarly are set at points ¼ and ¾, respectively, between texels A and C. As will become apparent below, setting the boundary lines at the ¼ and ¾ points advantageously allows the selectable mode smoothing filter address selection 200 (FIG. 5) to include relatively few logic gates.

The following discussion describes how a scale factor is calculated and assumes that the boundary lines 50, 52, 54, 56 are set at the ¼ and ¾ points as discussed above. Referring to FIG. 6, the sub-texel coordinates in range 64 are converted to a scale factor between 0 and 1. This conversion is accomplished by subtracting ¼ from each sub-texel coordinate in range 64 and then multiplying 2. Converting the ¼ sub-texel coordinate 50, for example, results in a scale factor of (¼−¼)*2=0. Similarly, the scale factor for the ¾ sub-texel coordinate 52 is (¾−¼)*2=1.

Table I defines the scale factors and the weighted averaging equations for the nine regions of FIG. 2, in accordance with the preferred embodiment in which boundaries 50, 52, 54, 56 are set at the ¼ and ¾ points.

TABLE I

Smoothing Filter Scale Factors and Averaging Equations

| REGION | TEXELS NEEDED | SCALE FACTORS | AVERAGING EQUATIONS |
|---|---|---|---|
| I | 1 | None | A (no averaging) |
| II | 2 | $A_S = 1 - 2(U_F - \frac{1}{4})$<br>$B_S = 2(U_F - \frac{1}{4})$ | $A \cdot A_S + B \cdot B_S$ |
| III | 1 | None | B (no averaging) |
| IV | 2 | $A_S = 1 - 2(V_F - \frac{1}{4})$<br>$C_S\ 2(V_F - \frac{1}{4})$ | $A \cdot A_S + C \cdot C_S$ |
| V | 4 | $A_S = 2(1 - 2(U_F - \frac{1}{4}))$<br>$(V_F - \frac{1}{4})$<br>$B_S = 4(U_F - \frac{1}{4})\ (V_F - \frac{1}{4})$<br>$C_S = 2(1 - 2(U_F - \frac{1}{4}))$<br>$(V_F - \frac{1}{4})$<br>$D_S = 4(U_F - \frac{1}{4})\ (V_F - \frac{1}{4})$ | $A \cdot A_S + B \cdot B_S +$<br>$C \cdot C_S + D \cdot D_S$ |
| VI | 2 | $B_S = 1 - 2(V_F - \frac{1}{4})$<br>$D_S\ 2(V_F - \frac{1}{4})$ | $B \cdot B_S + D \cdot D_S$ |
| VII | 1 | None | C (no averaging) |
| VIII | 2 | $C_S = 1 - 2(U_F - \frac{1}{4})$<br>$D_S\ 2(U_F - \frac{1}{4})$ | $C \cdot C_S + D \cdot D_S$ |
| IX | 1 | None | D (no averaging) |

In Table I, A, B, C and D represent the color values associated with texels A, B, C, and D. The values $U_F$ and $V_F$ represent the u, v sub-texel coordinate of the fractional texel coordinate falling within a one of the regions II, IV–VI, and VII (FIG. 2) in which scaled averaging is preferred. The values $A_S$, $B_S$, $C_S$, $D_S$ represent the scale factors computed in accordance with a preferred embodiment. It should be noted that the averaging equation for region V is more complex than for regions II, IV, VI and VIII because four texel values are averaged rather than two.

Figure 7:
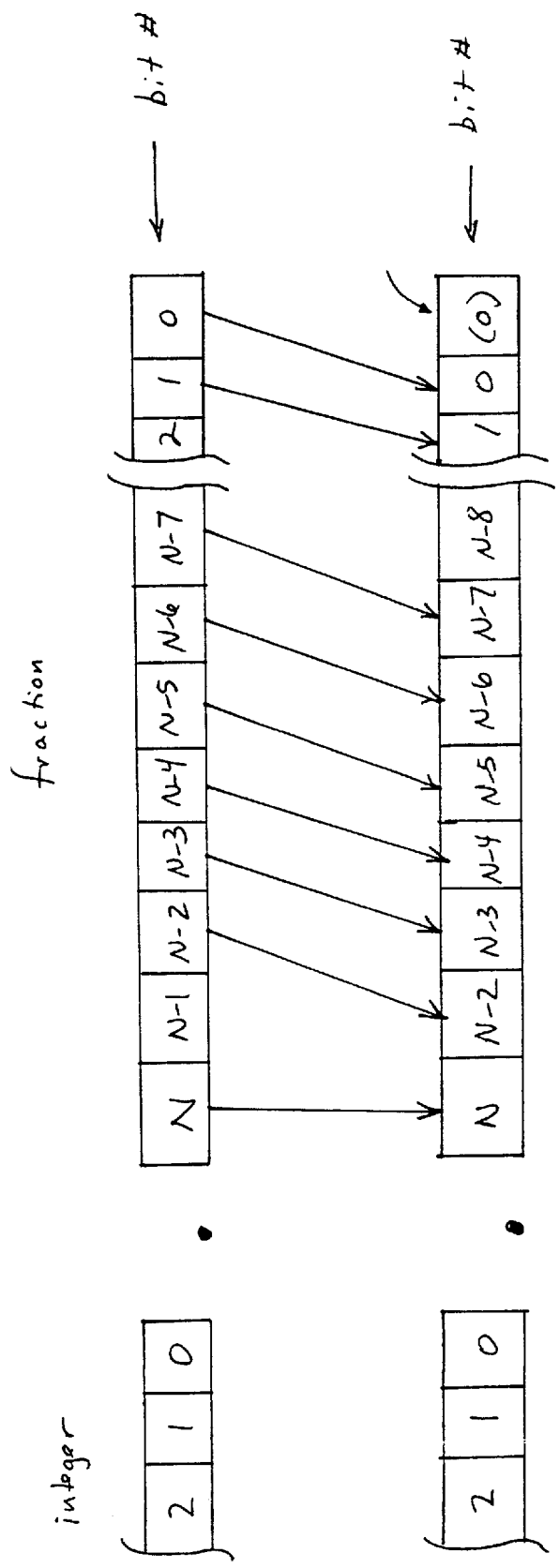
FIG. 7 further illustrates the preferred averaging technique of FIG. 6.

The mathematical operations necessary for the averaging equations in Table I (subtraction by ¼ and multiplication by 2) are simply bit shift operations in hardware or software. As one of ordinary skill in the art will understand, multiplication by 2 requires a bit shift to the left by one bit position. Further, only sub-texel coordinates in the second and third quarters are used to calculate the scale factors. As illustrated in FIG. 7, subtracting ¼ from sub-texel coordinates in the regions in which averaging is appropriate requires keeping the most significant bit N of the sub-texel coordinate, rejecting the next most significant bit N−1, and shifting the remaining bits to the left by one bit position. A bit value of 0 preferably is inserted in the right most bit position.

Accordingly, logic to implement the averaging equations is relatively simple and comprises standard shift registers and other common logic devices necessary for implementing the averaging equations in Table I. If desired, however, the boundary lines 50, 52, 54, 56 can be set at points other than the ¼ and ¾ points described previously. For example, referring back to FIG. 6, the boundary points 50, 52 of the intermediate range of sub-texel coordinates may represent the ⅛ and ⅞ boundary points. As such, the scale factor is computed by subtracting ⅛ and multiplying ⁴⁄₃ to convert the sub-texels coordinates in the range of ⅛ to ⅞ to the range of 0 to 1. Multiplying by ⁴⁄₃ requires more complex logic than simple shifts registers for implementing multiplication by 2. Although more complex logic may be required, the complexity required is within the grasp of one of ordinary skill in the art. It should also be realized that the location of the boundary lines 50, 52, 54, 56 defining the regions in which averaging is preferred may be programmable and the averaging equations may be implemented in software.

Figure 8:
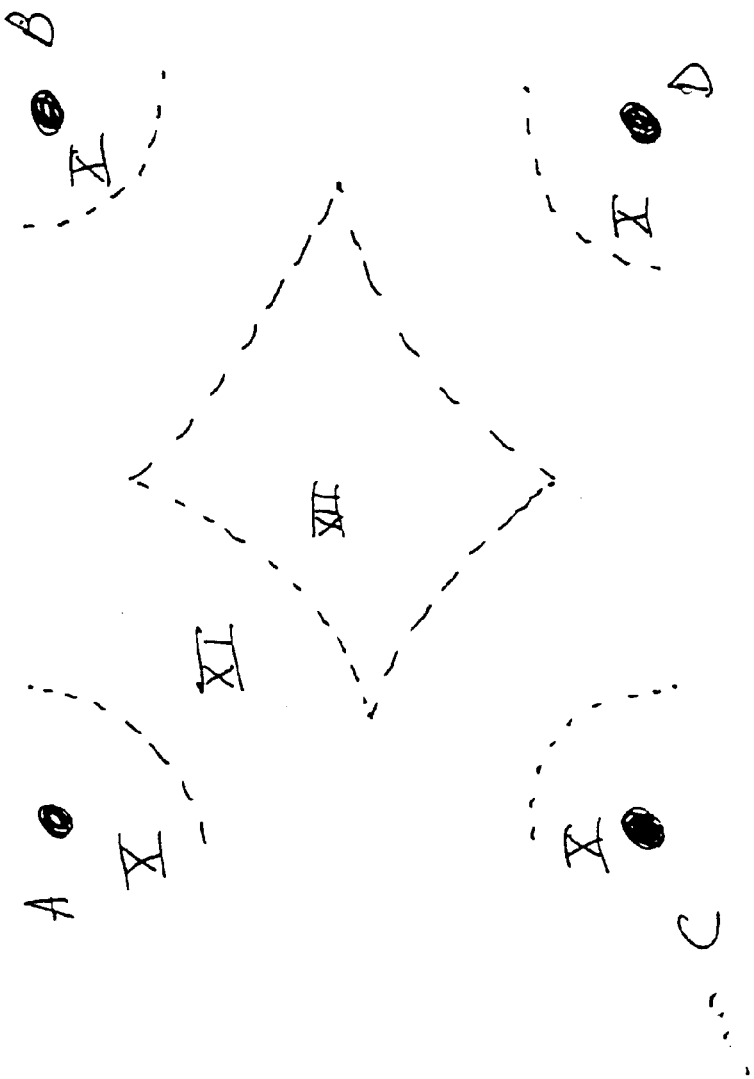
FIG. 8 shows an alternative texture map to that of FIG. 2.

By permitting the location of the boundary defining lines 50, 52, 54, 56 to be programmable, the present invention also advantageously allows for control over the sizes of the nine regions I–IX. Moreover, by controlling the sizes of the nine regions, the present invention provides flexibility in determining when to use each of the three texturing mapping techniques. Further, while a rectangular boundary region has been defined, it should be understood that other boundary schemes may be used without departing from the principles of the present invention, as shown for example in FIG. 8. In FIG. 8 point sampling may be used for u, v coordinates in regions X, two texel averaging in region XI, and four-texel averaging in region XII.

Figure 9:
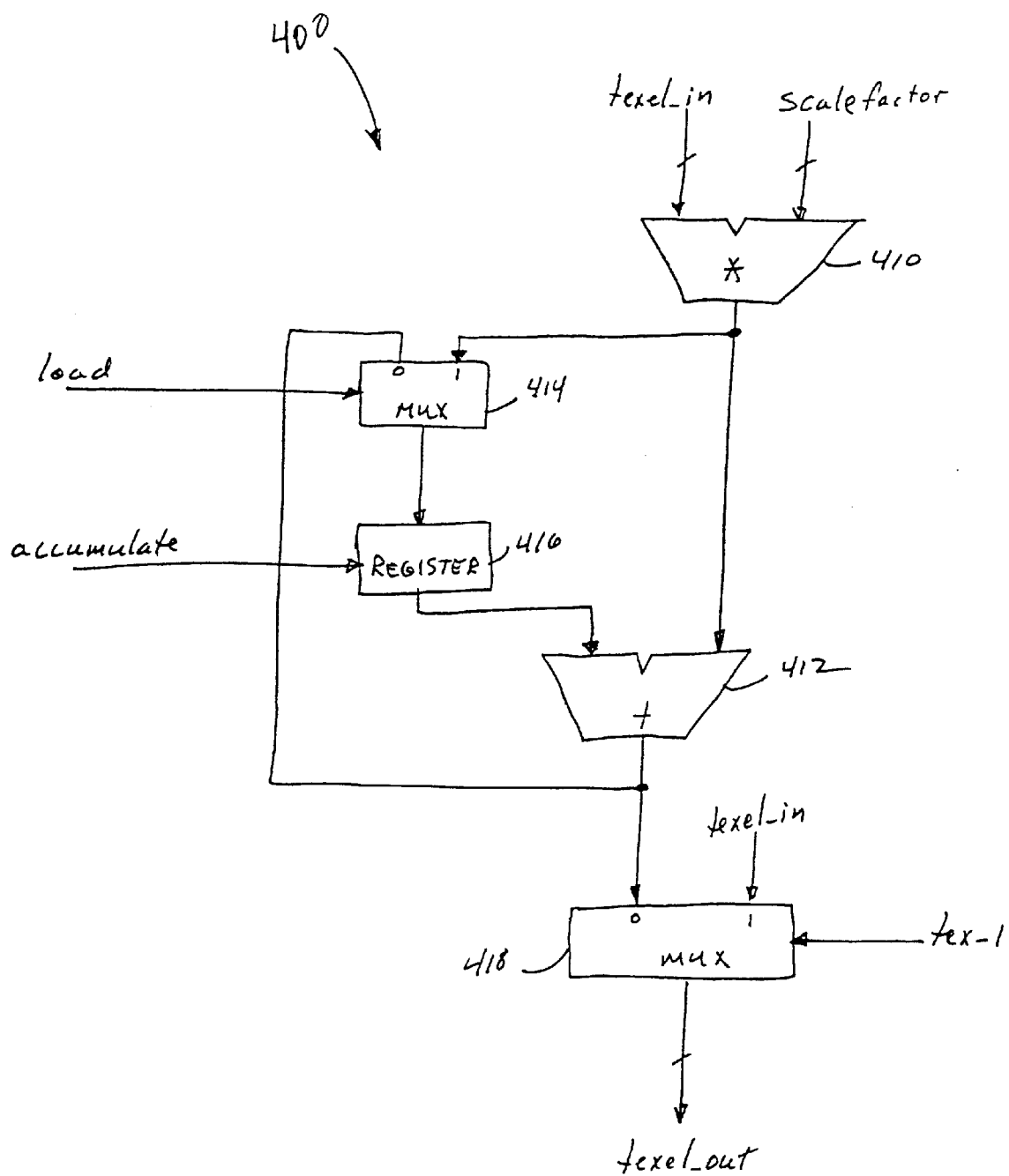
FIG. 9 is a schematic diagram of the selectable mode filter of FIG. 5 constructed in accordance with the present invention.

Referring now to FIGS. 5 and 9, the selectable mode filter 400 preferably includes multiplier 410, adder 412, multiplexers 414 and 418 and accumulator register 416. The input signals to the filter 400 include the texel_in value from texture memory 350 and scale factor, load, accumulate, and tex_1 signals from the selectable mode smoothing filter address selection 200. The texel_in value represents a texel value either to be averaged (during two or four-texel filtering) or to be used to render the pixel (during point sampling texture mapping). Selectable mode filter 400 generally performs adding and accumulating functions to compute the averaging equations in the fourth column of Table I. At substantially the same time that a texel value is retrieved from texture memory 350, an appropriate scale factor is provided by selectable mode smoothing filter address selection 200 during either two or four texel-averaging. Multiplier 410 multiplies the texel value by its scale factor. The output of multiplier 410 is provided to multiplexer 414 and selected as the output signal for multiplexer 414 output by the load control signal. The first texel*scale factor value from multiplier 410 is then loaded into accumulator register 416 when the accumulate signal is asserted. At this point, the first term in the averaging equation, such as A*$A_s$ from Table I, is loaded into the accumulator register 416. For each of the next two terms during four-texel averaging (terms 2 and 3), multiplier 410 multiplies the texel_in value by the associated scale factor and the resulting product is added to the current contents of the accumulator register by adder 412. The resulting sum of adder 412 is loaded through multiplexer 414 and stored in accumulator register 416.

When the fourth texel*scale term during four-texel averaging (or the second term during two-texel averaging) is computed by multiplier 410, it is added to the current contents of accumulator register 416 and provided as the output texel_out value from multiplexer 418 under control by the tex_1 signal from the selectable mode smoothing filter address selection 200. Thus the tex_1 signal is asserted to select the output value from adder 412 during two or four texel averaging.

If, instead, point sampling is required (i.e., no averaging required), the texel_in value, which is also provided directly to multiplexer 418 is selected via the tex_1 control signal from the selectable mode smoothing filter address selection 200. The texel_in value during point sampling is simply the closest pixel to the u, v coordinate generated by texture map address generator 150. Because no averaging is needed, the texel_out value is selected to be the texel_out value from the selectable mode smoothing filter 400.

Numerous variations and modifications will become apparent to those skilled in the art once the above disclosure is fully appreciated. It is intended that the following claims be interpreted to embrace all such variations and modifications.

What is claimed is:

1. A computer system that applies texel values from a texture map to computer screen pixels by selectively using a variety of texture mapping techniques, said computer system comprising:

a texture map address generator that converts an x, y pixel address to a fractional coordinate in a texture map including an integer portion and a fractional portion, said fractional coordinate corresponding to one of a plurality of regions in said texture map, said regions include a first plurality of regions in which point sampling is performed, a second plurality of regions in which two-texel averaging is performed, and another region in which four texel averaging is performed;

a selectable mode smoothing filter address selection unit coupled to said texture map address generator, said selectable mode smoothing filter address selection unit using said fractional coordinate to generate an integer coordinate in said texture map of a texel to be used in applying said texel values to said pixels, said selectable mode smoothing filter address selection unit further determining to which region said integer coordinate corresponds to determine an appropriate filtering technique to use to render a pixel, and further said selectable mode smoothing filter address selection unit calculating scale factors for two and four texel averaging in which said scale factor include the range of 0 to 1, including 0 and 1;

wherein said scale factors are calculated by subtracting a first value equal to ¼ from said fractional coordinate and multiplying the difference by a second value equal to 2;

a texture memory device that stores said texture map; and an address translator disposed between said selectable mode smoothing filter address selection unit and said texture memory that translates said integer texture map coordinate to a texture memory address.

2. The computer system of claim 1 wherein said selectable mode smoothing filter address selection unit includes a shift register to multiply said difference by said second value.

3. A graphics processor that applies texel values from a texture map to computer screen pixels by selectively using a variety of texture mapping techniques, said computer system comprising:

a texture map address generator that converts an x, y pixel address to a fractional coordinate in a texture map including an integer portion and a fractional portion, said fractional coordinate corresponding to one of a plurality of regions in said texture map, said regions including a first plurality of regions in which point sampling is performed, a second plurality of regions in which two-texel averaging is performed, and another region in which four texel averaging is performed;

a selectable mode smoothing filter address selection unit coupled to said texture map address generator, said selectable mode smoothing filter address selection unit using said fractional coordinate to generate an integer coordinate in said texture map of a texel to be used in applying said texel values to said pixels, said selectable mode smoothing filter address selection unit further determining to which region said integer coordinate corresponds and calculating scale factors for two and four texel averaging in which said scale factors include the range of 0 to 1, including 0 and 1, wherein said scale factors arc calculated by subtracting a first value equal to ¼ from said fractional coordinate and multiplying the difference by a second value equal to 2;

a texture memory device that stores said texture map;

an address translator disposed between said selectable mode smoothing filter address selection unit and said texture memory and that translates said integer texture map coordinate to a texture memory address; and a selectable mode smoothing filter for computing the texel value to be applied to said computer screen pixels based on a filtering technique dynamically selected when rending each pixel.

4. The computer system of claim 3 wherein said selectable mode smoothing filter address selection unit includes a shift register to multiply said difference by said second value.

5. A texture filtering method of applying a texel value from a texture map to a pixel on a computer screen using a dynamically selectable texture filtering technique, comprising:

(a) dividing said texture map into a plurality of regions;

(b) converting a screen pixel address to a fractional coordinate in a texture map, said fractional coordinate including an integer portion and a fractional portion and said texture map including integer texel values; and (c) computing a first scale factor within the range of 0 to 1 and a weighted four-texel average using said first scale factor if said fractional coordinate is within a first region in said texture map; or (d) computing a second scale factor within the range of 0 to 1 and a weighted two-texel average using said second scale factor if said fractional coordinate is within a second region in said texture map; or (e) selecting a nearest texel to said fractional coordinate if said fractional coordinate is within a third region in said texture map;

wherein computing said first and second scale factors includes subtracting a first value equal to ¼ from said fractional coordinate and multiplying the difference by a second value equal to 2.

* * * * *